US007187464B2

(12) United States Patent
Auer et al.

(10) Patent No.: US 7,187,464 B2

(45) Date of Patent: Mar. 6, 2007

(54) METHOD AND DEVICE FOR CONTROLLING A PRINTING MATERIAL PROCESSING MACHINE

(75) Inventors: Klaus Auer, Hockenheim (DE); Stephan Ehrhardt, Neulussheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 941 days.

(21) Appl. No.: 10/371,249

(22) Filed: Feb. 19, 2003

(65) Prior Publication Data

US 2003/0160978 A1 Aug. 28, 2003

(30) Foreign Application Priority Data

Feb. 20, 2002 (DE) ................................ 102 07 054

(51) Int. Cl.

*G06F 3/12* (2006.01)
*G06K 1/00* (2006.01)
*G06K 15/00* (2006.01)

(52) U.S. Cl. ...................... 358/1.15; 358/1.9; 358/1.13

(58) Field of Classification Search ............... 358/1.15, 358/1.14, 1.13, 1.9

See application file for complete search history.

(56) References Cited

U.S. PATENT DOCUMENTS

| | | | | |
|---|---|---|---|---|
| 4,669,050 | A | 5/1987 | Buschmann et al. | 364/569 |
| 4,972,354 | A | 11/1990 | Hauck et al. | 364/550 |
| 5,539,864 | A | 7/1996 | Hauck et al. | 395/105 |
| 6,144,886 | A * | 11/2000 | Lee | 700/57 |
| 6,655,771 | B2 * | 12/2003 | Matsumoto et al. | 347/13 |
| 6,854,821 | B2 * | 2/2005 | Ericson et al. | 347/14 |

FOREIGN PATENT DOCUMENTS

| | | |
|---|---|---|
| DE | 3407790 | 1/1985 |
| DE | 3720272 | 12/1988 |
| DE | 4229645 | 3/1994 |
| EP | 0809156 | 11/1997 |

OTHER PUBLICATIONS

Foerster: "Erfahrungen mit Bitprozessorsteuerungen von Druckmaschinen" in Maschinenbautechnik vol. 31, 1982, pp. 314-315 (see translation).

* cited by examiner

*Primary Examiner*—Douglas Q. Tran
(74) *Attorney, Agent, or Firm*—Davidson, Davidson & Kappel, LLC

(57) ABSTRACT

A method and a device for controlling a printing material processing machine (1, 2, 3), which has at least one processing unit in which the positional and speed data of a printing substrate to be transported through the printing material processing machine are recorded, where, on the basis of the recorded positional and speed data, the instantaneous position of the printing substrate is calculated and stored in memory unit of the processing unit; in addition to the instantaneous position of a printing substrate to be transported through the printing material processing machine, additional command data being stored in the memory unit.

9 Claims, 2 Drawing Sheets

METHOD AND DEVICE FOR CONTROLLING A PRINTING MATERIAL PROCESSING MACHINE

Priority to German Patent Application No. 102 07 054.7, filed Feb. 20, 2002 and hereby incorporated by reference herein, is claimed.

BACKGROUND INFORMATION

The present invention is directed to a method for controlling a printing material processing machine and to a device for controlling the same.

To control or regulate the time sequence of operations in printing material processing machines, numerous procedures are known, which use software to simulate the printing substrates to be transported through the printing material processing machine. This means that when a printing material, i.e. a printing substrate, preferably a paper sheet, is transported through a printing material processing machine, in particular a printing press, speed and position sensors in the printing press are used to store the particular position and corresponding speed of a specific sheet at a specific point in time in the printing press, in a memory device. Such a procedure is known, for example, from German Patent Application No. DE 42 29 645 A1. In this procedure, when working with a running printing press having a digital position-measuring system, the position of a printing substrate within the printing press is measured in relation to a reference location. In addition, a digital speed sensor is used to continually record the transport speed of the printing substrate along its transport path, the printing speed of the printing press, or the speed of specific drive system components of the printing press. In the process, the data of the position-measuring system and of the speed sensor are continuously fed to a computer, which constitutes part of the machine control of the printing press. Moreover, the computer of the machine control receives other signals from transmitters and sensors mounted on various components of the printing press. On the basis of the thus discretized printing substrate, it is assured that the processing steps for a printing substrate always take place precisely when the printing substrate is in the position required for the processing step. Such a method eliminates the influences of dead and delay times associated with every actuator or switching element of a printing press and, in this way, improves the accuracy of a printing press.

A system for simulating the conveyance of a paper sheet through a copying machine is known from European Patent Application No. 0 809 156 A1. In this system, on the basis of data obtained via sensors from the real transport system of a copying machine, a virtual sheet-transport system is simulated. In this way, the proper functioning of the sheet transport through the copying machine can be checked. The virtual sheet in such a simulation system is represented, in this context, by the opposite ends of a paper sheet and the distance therebetween, thus the length of the sheet. The beginning, end and length of the paper sheet are then stored as data, always as a predetermined unit transported through the virtual sheet-transport system of the copying machine. In this manner, the position of the paper sheet in the copying machine can be determined at any point in time.

An object of the present invention is to devise a method and a device for implementing a method, which enable individual sheets, passing through a printing material processing machine, to be marked in such a way that they run through specific process sequences at specific positions of the printing material processing machine. It is intended, in the process, to especially avoid any visible marking of the sheets, such as marks produced by punching.

The present invention provides a method for controlling a printing material processing machine (1, 2, 3), which has at least one processing unit in which the positional and speed data of a printing substrate to be transported through the printing material processing machine are recorded, where, on the basis of the recorded positional and speed data, the instantaneous position of the printing substrate is calculated and stored in memory means of the processing unit. In addition to the instantaneous position of a printing substrate to be transported through the printing material processing machine, additional command data are stored in the memory means.

The method according to the present invention provides the considerable advantage that information or commands associated with a specific printing substrate, are transported in a time-synchronous or angle-synchronous manner through a printing material processing machine. In conventional printing material processing machines, printing substrates, in particular paper sheets, whose processing deviates from the normal processing, are physically marked. This means that either a mark is imprinted on the paper sheet, or a hole is punched in, thereby signaling to the particular processing station of a printing press that this punched sheet is to undergo a particular processing step. This can mean, for example, pulling out a sample sheet. The disadvantage of marking a paper sheet in this way is, of course, that the sheet is physically altered, i.e., it has a visible mark that has a disruptive effect. The method according to the present invention has found an elegant way to circumvent this problem since the sheet is no longer physically marked, but is virtually marked. For this reason, the control of the printing material processing machine has a special program which virtually simulates all of the paper sheets to be transported through the printing material processing machine. Using such a technology, one may access the instantaneous position of any one paper sheet in the printing press at any given point in time. Besides the momentary situation of a paper sheet in the printing material processing machine, the method according to the present invention additionally provides for storing other data and information. The data may thus include a virtual marking or a specific command. If, at this point, the real and the virtual paper sheet, which, of course, are always transported simultaneously through the machine, arrive at the station where the additionally stored command or the marking are to trigger a process, then this process is executed at the station. However, the real paper sheet subjected to this process is not distinguished at all from the other paper sheets, since no physical marking had been applied. Outwardly, therefore, the paper sheet is completely intact and undamaged. Another significant advantage of the method is that the need is eliminated for sensors for detecting a marking or any other change in the paper sheet at the stations of the printing material processing machine which carry out the process. The special processing step is thus triggered at the station of the printing material processing machine exclusively on the basis of the data pertaining to the sheet in question stored in the machine control.

Instead of storing the speed and positional data, as well as the additional command data of a paper sheet to be transported through the printing material processing machine in accordance with the present invention as a function of the particular point in time, it is also possible to store the particular corresponding angular position. This procedure is preferred in printing presses, since they require an ongoing counting of the machine angles, which makes these angles useful as a reference basis. The technique of continually counting the machine angle is conditional upon angles which increase by 360 degrees with every rotation.

To determine the speed and the positional data of a paper sheet to be transported through the printing material processing machine, the incremental encoders of the individually rotating cylinders or the machine tachometer, already present in a printing material processing machine, are advantageously operated as data suppliers. This makes it possible to economize on additional sensors, which would otherwise be needed to supply the mentioned data.

The present invention also provides a device for controlling a printing material processing machine (1, 2, 3), which has at least one processing unit for recording positional and speed data of a printing substrate to be transported through the printing material processing machine, and which has memory means in the processing unit for storing the instantaneous position of the corresponding printing substrate calculated on the basis of the recorded positional and speed data. The memory means are designed to store assigned command data, in addition to the instantaneous position of a printing substrate to be transported through the printing material processing machine.

BRIEF DESCRIPTION OF THE DRAWINGS

In the following, advantageous specific embodiments of the present invention are further clarified and described on the basis of figures, in which.

DETAILED DESCRIPTION

Figure 1:
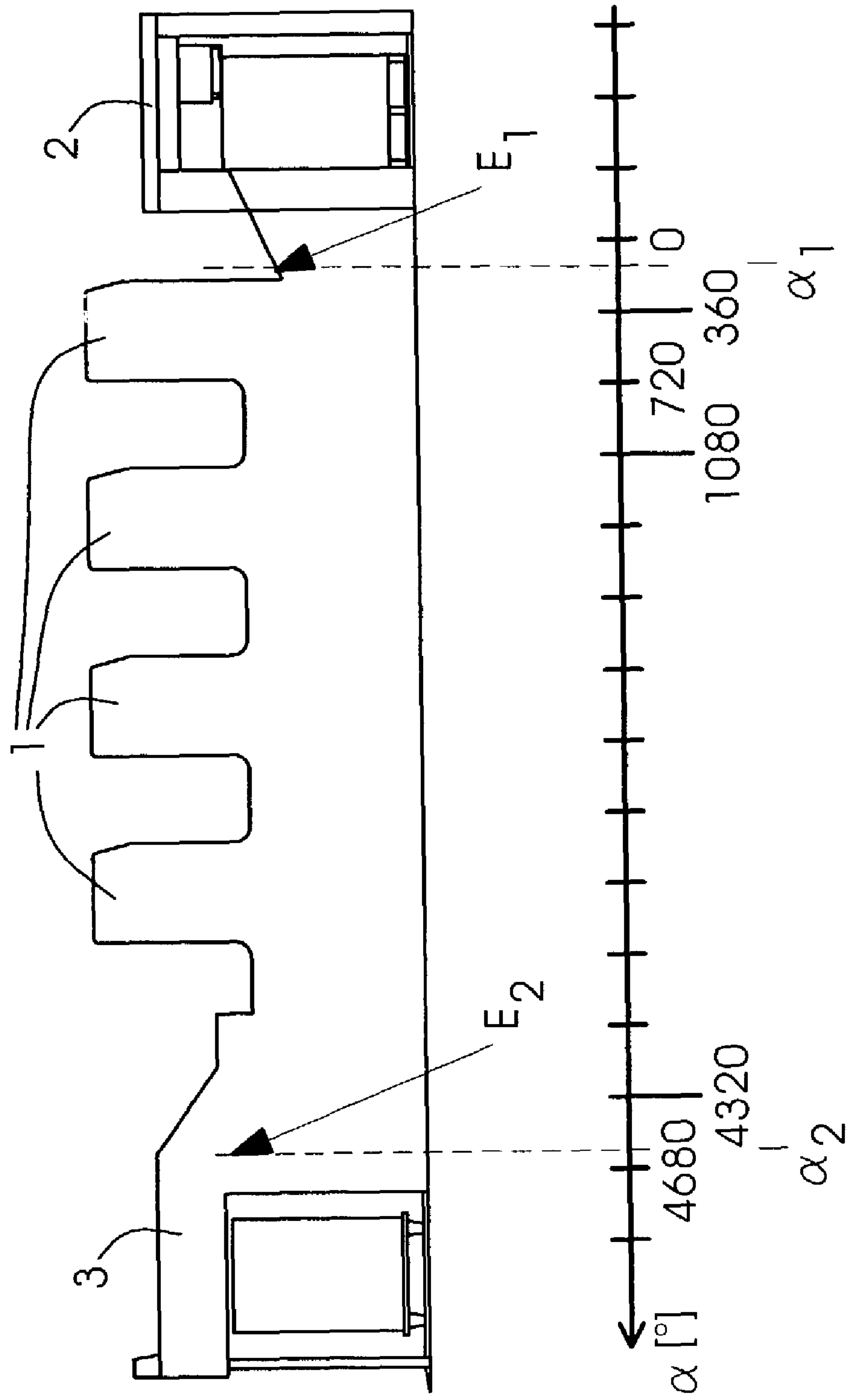
FIG. 1 shows a schematic side view of a printing press having an assigned angular machine axis.

The printing press shown in FIG. 1 is made up of a plurality of print units 1, a feeder 2 and a sheet-delivery unit 3. Between feeder 2 and first print unit 1, a side pull lay E1 is installed which enables paper sheets coming from feeder 2 to be laterally shifted by a specific value. In sheet-delivery unit 3 of the printing press, a so-called brake band is installed, whose task is to brake the paper sheets coming from the printing press to an extent that allows the sheets to be stacked reliably and without being damaged in the sheet-delivery unit. The brake band brakes the sheet by applying friction between the brake band and the sheet. For that reason, it is important that the brake band does not touch the sheet in a printed area, since, otherwise, the print image would be damaged. To traverse the distance between pull lay E1 and brake band E2, a paper sheet requires a specific amount of time or, since printing presses work with many rotating components, a specific machine angle. The zero point (reference point) of the machine angle is situated in the area of feeder 2, so that, upon exiting sheet-delivery unit 2, depending on the machine speed, the paper sheet has covered a specific machine angle. In FIG. 1, upon entering into pull lay E1, the paper sheet has a machine angle of $\alpha 1$=120 degrees. When this paper sheet reaches the brake band, it has a machine angle of $\alpha 2$=4590 degrees. Thus, the machine angle is used as a reference point for each sheet which runs through the printing press. In this manner, for each sheet passing through the printing material processing machine, the corresponding location in the printing press is able to be determined at every instant. The control of the printing press has a computer in which any data containing the machine status and the processes taking place, may be stored. On the basis of this data, such as machine speed, the position and speed of any one paper sheet to be transported through the printing press may be calculated and stored in the computer's memory, as data assigned to the particular paper sheet. In this manner, a virtual sheet transport through the printing press is simulated in the computer. When a new paper sheet passes the zero-degree mark on the scale in FIG. 1, then a machine angle of 0 degrees is assigned to this sheet in the computer of the machine control. Since the speed data of the printing press are continuously recorded, the fact that the sheet reaches the side pull lay at $\alpha 1$=120 degrees may now be clearly assigned to this paper sheet. If the paper sheet in question is pulled laterally to the left in FIG. 1 by a specific value, e.g. 1 mm, at the side pull lay, then this lateral displacement, which is transmitted by sensors at the side pull lay to the computer, as well as the location of the displacement, in this case the side pull lay, are stored as information associated with the paper sheet in question. In addition, the use of the pull lay has the effect that a further entry is stored which includes a command for the paper sheet to be moved when it reaches a brake band in sheet-delivery unit 3 of this brake band, by the lateral displacement, in this case 1 mm, laterally to the left. Since the distance between the pull lay and the brake band is always constant, the brake band also has a constant machine angle, in this case $\alpha 2$=4590 degrees. As soon as the virtual paper sheet reaches this machine angle of $\alpha 2$=4590 degrees, the command assigned to this sheet, namely for the brake band to be moved by 1 mm to the left, is executed, so that the real paper sheet comes to rest properly on the brake band, since the brake band is moved precisely by this value. When the paper sheet has exited sheet-delivery unit 3, the corresponding paper sheet in the machine control is erased in order to clear the memory for new paper sheets which enter into the printing press at the zero-degree machine angle. Additionally, it is also possible to erase sheets from the memory should they become lost in the course of a turn between print units 1. If, for example, a sensor in the printing press between two print units 1 signals that a sheet is lost, then a message to this effect is relayed to the computer of the machine control. Since the location of the sensor is known and the instantaneous location of all paper sheets to be transported through the machine is likewise stored on the basis of the particular machine angle, it is necessary to clearly ascertain which paper sheet is lost. This paper sheet may be erased in the machine control.

Figure 2:
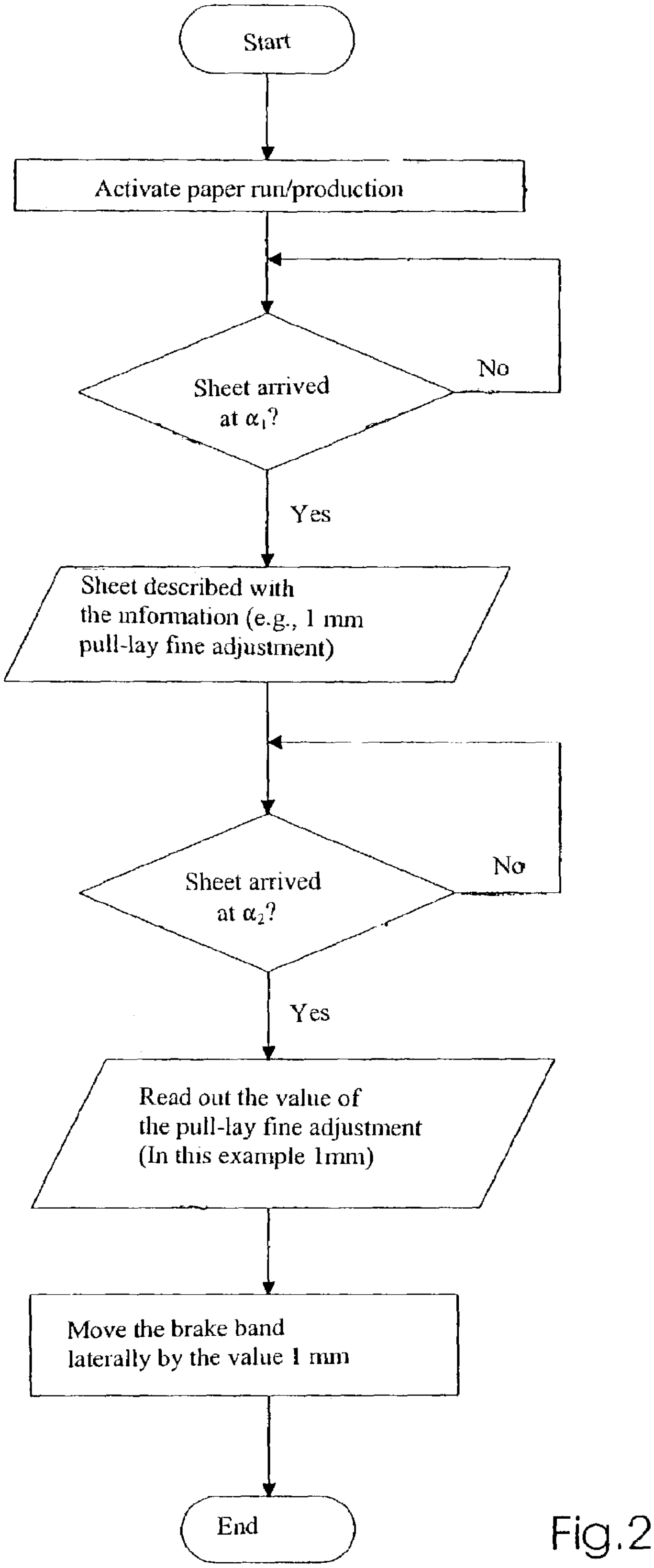
FIG. 2 shows a flow chart for describing the process in the context of a pull-lay fine adjustment.

The flow chart according to FIG. 2 illustrates the functional sequence, as it occurs upon activation of pull lay E1. A start command sets the printing press into production, and the paper run of feeder 2 is started. At this point, it is queried in a loop whether a virtual paper sheet has passed machine angle $\alpha 1$ to which the pull lay is assigned. For as long as this is not the case, this query is made without interruption. When a virtual sheet reaches angle $\alpha 1$, the corresponding real sheet is displaced to the side by a specific amount, by the pull lay. This amount is stored as an amount belonging to the virtual sheet. In the further course, it is queried whether the virtual sheet has arrived at $\alpha 2$. As soon as the sheet reaches machine angle $\alpha 2$, the value of the pull lay adjustment is read out of the memory field associated with the virtual sheet. The brake band is now moved laterally by precisely this value, so that the paper sheet comes to rest properly on the brake band. When the pull lay is used, this procedure is converted as software in a subprogram, which runs on the computer of the machine control. For other process sequences which relate to the paper sheet, other subprograms are stored in the computer of the machine control. Thus, another program may be present which controls removal of the sample sheet.

In this connection, a sheet-removal device is provided at a specific location of the printing press between the last print unit and sheet-delivery unit 3. The press operator may now specify, for example, that every hundredth sheet which passes through the printing press is to be grabbed by the sample-sheet removal device. To that end, the subprogram "sample-sheet removal" assigns the command "sample-sheet removal" to every hundredth sheet. It is stored as a command that is associated with the virtual sheet, in the computer of the machine control. As soon as a sheet that is associated with the command "sample-sheet removal" reaches the removal station, the command is executed, and the sample sheet is removed.

The present invention is, of course, not limited to the two processes presented here of pull-lay adjustment and sample sheet removal. It may be used for all processes in a printing press or in a folding unit, as well, that require the processing of a sheet.

The term "printing material processing machine" as used herein includes any machine for printing a material, for example a paper, cardboard or plastic.

| Reference Symbol List | |
|---|---|
| 1 | print unit |
| 2 | feeder |
| 3 | sheet-delivery unit |
| E1 | pull lay |
| E2 | brake band |
| $\alpha 1$ | angular machine position - pull lay |
| $\alpha 2$ | angular machine position - brake band |

What is claimed is:

1. A method for controlling a printing material processing machine having at least one processing unit for recording positional and speed data of a printing substrate to be transported through the printing material processing machine, comprising the steps of:

calculating an instantaneous position of the printing substrate as a function of the recorded positional and speed data and storing the instantaneous position in a memory of the processing unit, and storing additional command data in addition to the instantaneous position in the memory.

2. The method as recited in claim 1 wherein the instantaneous position, as well as the additional command data of the printing substrate to be transported are stored as a function of a particular angular position.

3. The method as recited in claim 1 wherein the instantaneous position, as well as the additional command data of the printing substrate to be transported through the printing material processing machine are stored as a function of a particular point in time.

4. The method as recited in claim 1 wherein the speed and positional data for determining the instantaneous position of the printing substrate are determined using a machine tachometer or incremental encoder.

5. The method as recited in claim 1 wherein the additional command data of the corresponding printing substrate are executed at the machine position contained in the additional command data.

6. The method as recited in claim 1 wherein the additional command data of a corresponding printing substrate includes a pull-lay fine adjustment command, the pull-lay fine adjustment command causing the corresponding printing substrate to be laterally displaced at a machine station, the corresponding printing substrate being a sheet.

7. The method as recited in claim 1 wherein the additional command data of a corresponding printing substrate includes a sample-sheet removal command for removing the corresponding printing substrate from the printing material processing machine when the corresponding printing substrate passes a sheet-removal device.

8. A device for controlling a printing material processing machine comprising:

at least one processing unit for recording positional and speed data of a printing substrate to be transported through the printing material processing machine, and a memory in the processing unit for storing an instantaneous position of the corresponding printing substrate calculated on the basis of the recorded positional and speed data, the memory also storing assigned command data, in addition to the instantaneous position of a printing substrate to be transported through the printing material processing machine.

9. A printing material processing machine comprising:

a printing unit; and a control device, the control device including at least one processing unit for recording positional and speed data of a printing substrate to be transported through the printing material processing machine, and a memory in the processing unit for storing an instantaneous position of the corresponding printing substrate calculated on the basis of the recorded positional and speed data, the memory also storing assigned command data, in addition to the instantaneous position of a printing substrate to be transported through the printing material processing machine.

* * * * *